United States Patent
Smith et al.

(10) Patent No.: US 10,379,829 B2
(45) Date of Patent: Aug. 13, 2019

(54) SYSTEM AND METHOD FOR RESTRICTING SYSTEM AND APPLICATION SOFTWARE AVAILABLE FOR INSTALLATION ON A MANAGED MOBILE DEVICE

(71) Applicant: BlackBerry Limited, Waterloo (CA)

(72) Inventors: Andrew Christopher Smith, Oakville (CA); Thomas Owen Parry, Cambridge (CA); Srdan Dikic, Waterloo (CA); Spencer Leavitt George Quin, Kitchener (CA); Christopher Donald MacDonald, Cambridge (CA); Michael William Loosemore, Kitchener (CA); Jason Lee Carter, Davie, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/632,939

(22) Filed: Feb. 26, 2015

(65) Prior Publication Data

US 2016/0253159 A1 Sep. 1, 2016

(51) Int. Cl.
*G06F 8/61* (2018.01)
*G06F 8/65* (2018.01)
*H04W 88/02* (2009.01)

(52) U.S. Cl.
CPC ............ *G06F 8/61* (2013.01); *G06F 8/65* (2013.01); *H04W 88/02* (2013.01)

(58) Field of Classification Search
CPC ............ G06F 8/61; G06F 8/65; H04W 88/02
USPC ........................................................ 717/172
See application file for complete search history.

(56) References Cited

U.S. PATENT DOCUMENTS

| | | | |
|---|---|---|---|
| 6,263,497 B1 * | 7/2001 | Maeda | G06F 8/64 707/999.202 |
| 7,480,907 B1 | 1/2009 | Marolia et al. | |
| 7,546,595 B1 | 6/2009 | Wickham et al. | |
| 8,589,909 B2 * | 11/2013 | Hu | G06F 8/67 717/168 |
| 2005/0262498 A1 * | 11/2005 | Ferguson | G06F 8/65 717/172 |
| 2006/0168574 A1 * | 7/2006 | Giannini | G06F 8/65 717/168 |
| 2010/0031352 A1 * | 2/2010 | Kethireddy | G06F 21/10 726/21 |

(Continued)

OTHER PUBLICATIONS

PCT International Search Report; Application No. PCT/US2016/019547; dated Jun. 2, 2016; 5 pages.

(Continued)

*Primary Examiner* — Emerson C Puente
*Assistant Examiner* — Sen Thong Chen
(74) *Attorney, Agent, or Firm* — Trop, Pruner & Hu, P.C.

(57) ABSTRACT

A method for managing software on a device is provided. The method comprises: receiving, from a third party associated with the device, by a software administrator of an organization different from the third party, release information regarding software versions for the device; creating, by the software administrator, a profile that specifies whether or not at least one of the software versions is allowed on the device; and transmitting the profile, by the software administrator to a server computer associated with the third or other parties, to promote enforcement of the profile for the device.

19 Claims, 7 Drawing Sheets

(56) References Cited

U.S. PATENT DOCUMENTS

| | | | |
|---|---|---|---|
| 2011/0078675 A1* | 3/2011 | Van Camp | G06F 8/65 717/170 |
| 2012/0272231 A1* | 10/2012 | Kwon | G06F 8/61 717/173 |
| 2013/0282564 A1* | 10/2013 | Sibbald | H04M 1/72525 705/39 |
| 2014/0007070 A1 | 1/2014 | Huang et al. | |
| 2014/0059196 A1* | 2/2014 | Onffroy | G06F 11/3688 709/223 |
| 2014/0282869 A1* | 9/2014 | Dabbiere | H04L 63/10 726/3 |
| 2015/0050922 A1* | 2/2015 | Ramalingam | H04W 12/08 455/418 |
| 2015/0287083 A1* | 10/2015 | Gupta | G06Q 30/0257 705/14.55 |
| 2016/0117125 A1* | 4/2016 | Starr | G06F 3/0625 713/310 |
| 2016/0344745 A1* | 11/2016 | Johnson | H04L 67/34 |

OTHER PUBLICATIONS

PCT Written Opinion of the International Searching Authority; Application No. PCT/US2016/019547; dated Jun. 2, 2016; 10 pages.
European Examination Report; Application No. 16157722.6; dated Jun. 2, 2016; 12 pages.
PCT Written Opinion of the International Preliminary Examining Authority; Application No. PCT/US2016/019547; dated Feb. 1, 2017; 6 pages.
PCT International Preliminary Report on Patentability; Application No. PCT/US2016/019547; dated May 22, 2017; 20 pages.

* cited by examiner

Profile Name
[_____] ~412

Profile Description
[_____] ~414

☐ Force Upgrade to Max Allowed for a Given Device/Carrier
416

Min  [10.0.0 ▼]          Max  [10.0.0 ▼]
      10.1.0                    10.1.0
      10.2.0                    10.2.0
         418                    10.2.1
                                10.3.1
                                   420
                                            422
Exceptions/Overrides

| Disposition | Model | OS Min | OS Max |
|---|---|---|---|
| Allow | Z10 | 10.0.0 | 10.3.0 |
| Disallowed | Z30 | 10.3.0 | 10.3.0 |

Figure 4

SYSTEM AND METHOD FOR RESTRICTING SYSTEM AND APPLICATION SOFTWARE AVAILABLE FOR INSTALLATION ON A MANAGED MOBILE DEVICE

BACKGROUND

As used herein, the terms "mobile device", "device", "user equipment", "UE", and the like may refer to easily transportable devices such as mobile telephones, personal digital assistants, handheld or laptop computers, and similar devices that have telecommunications capabilities. Such terms may also refer to devices that have similar capabilities but that are not transportable, such as fixed line telephones, desktop computers, or set-top boxes. In many cases, such devices may be manufactured by a first entity and then deployed for use by a second entity. For example, an electronics manufacturer may manufacture a mobile telephone, and a telecommunications service provider may manage the services available through the device. Such a manufacturer may be referred to herein as a device provider, and such a telecommunications service provider may be referred to herein as a service provider.

Operating system software, communications-related software, application-related software, and other software used by such devices may be upgraded or otherwise modified from time to time. The device provider, the service provider, or some other entity may make the modified software available to the device users, and the users may choose to install the modified software on their devices. Such modifications may be referred to as updates, new versions, new releases, new builds, or similar terms. Hereinafter, any such modified software will be referred to as a version of the software or a software version or simply a version.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates a graphical user interface that may be used by an administrator of a system for managing software according to an embodiment of the disclosure.

DETAILED DESCRIPTION

Figure 1:
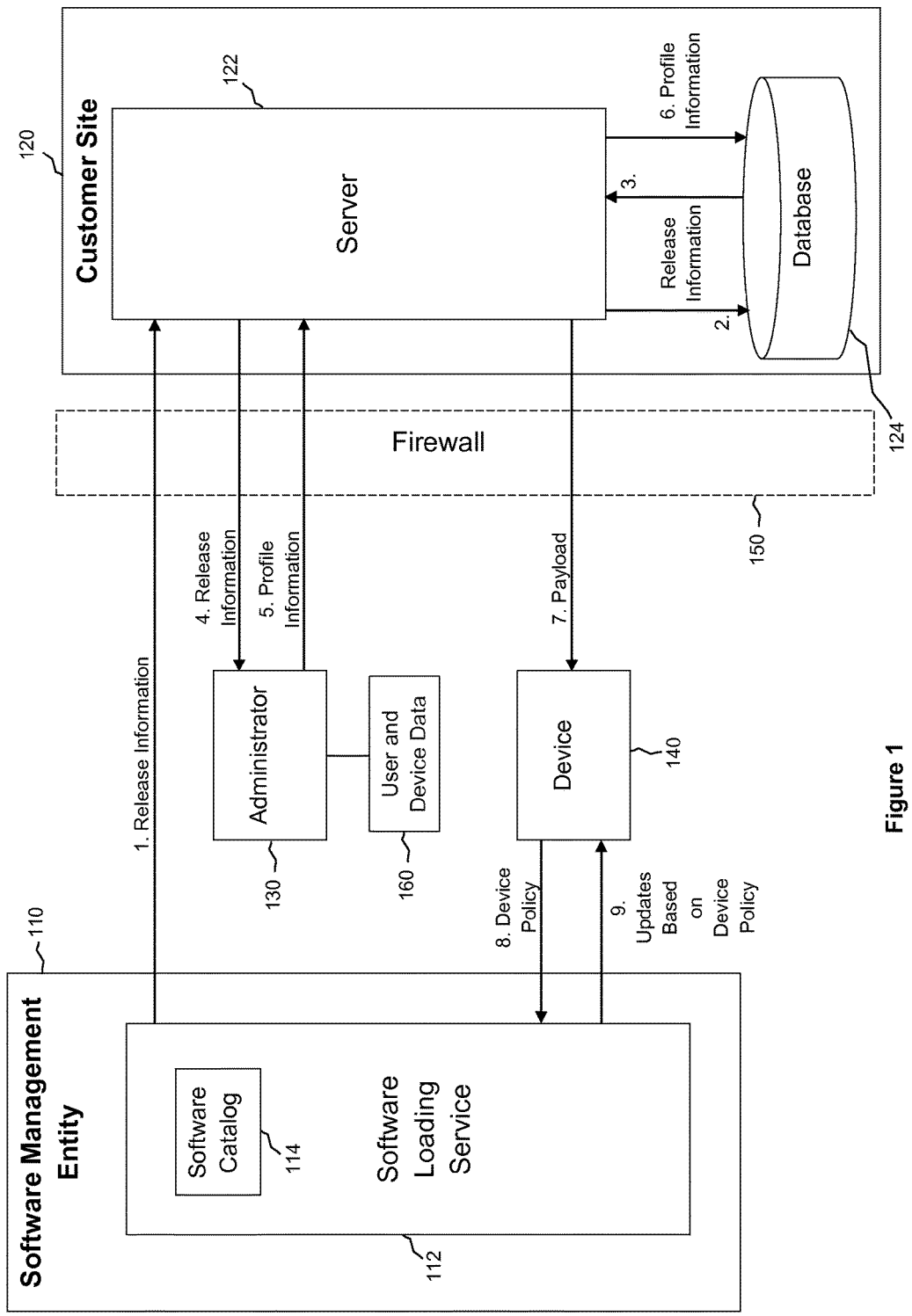
FIG. 1 is a block diagram of a system for managing software according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A business, a government agency, or some other type of enterprise or organization may provide persons under its management with a mobile device for use in conducting the organization's activities or may otherwise manage the devices used by those persons. When an organization manages a large number of devices, the organization may employ an administrator to oversee the usage of the devices, particularly in cases where the devices may have access to the organization's data resources. The administrator may be an individual or a group that ensures that the hardware and software on the devices are up to date, that only authorized devices are allowed access to the organization's data resources, and that the devices are otherwise being used in accordance with the organization's policies. For example, when a new software version becomes available, such as by a device provider or a service provider, for one or more of the devices managed by the administrator, the administrator may oversee the installation of the new version on the appropriate devices.

An organization that manages a large number of devices may not necessarily want to accept every new software version that becomes available for every device. For example, a government agency or an organization in a highly regulated industry may have strict security requirements and may perform its own internal certification procedures to determine the mobile device software that may be installed on the devices it manages. Such an organization may wish to perform additional testing of the versions or perform other actions to ensure that the versions meet the standards of the organization. The organization may also wish to allow a new software version for some devices and not for other devices or may wish to allow only certain versions within a suite of available versions. Also, an organization may modify, for example, open source software to suit its needs. If a provider of open source software updates the software that an organization had previously modified, the organization may wish to delay installing the updated software until the organization ensures that the updated software is compatible with the modifications the organization made to the previous version of the open source software.

A device provider or a service provider may have control over which software versions are installed on devices manufactured or deployed by the device provider or service provider. However, a third-party administrator who is not managed by a device provider or a service provider typically must accept all available updates or none at all. As discussed above, it may be desirable for such an administrator to have the capability to determine which versions among a set of available versions are to be installed on the devices the administrator manages.

Embodiments of the present disclosure allow an organization's administrator who is not under the management of a device provider or a service provider to view a plurality of software versions available for devices under the control of the administrator. The administrator may then specify which of the available versions are allowed to be installed on which devices and/or which of the available versions are prohibited from being installed on which devices. Such a specification may apply to a single device, a group of devices, a single device user, a group of device users, or to some combination of devices and users.

It should be understood that only one version of a particular unit of software is typically installed on a device at a given time. For example, version 10.1 and version 10.2 of a web browser would typically not be installed on the same device at the same time. However, multiple different units of software may be installed on a device simultaneously, such as a web browser, an email program, a calendar program, and other applications, each of which may have its own version number. Therefore, when mention is made herein to a software version or software versions being available to a device, it should be understood that the version or versions may be a version for a single unit of software or multiple different versions, each for a different unit of software.

The information regarding which software versions are currently available for devices under the control of an administrator may be referred to herein as release information. The relevant characteristics of the devices and device users under the control of an administrator and the software version restrictions and allowances that may pertain to those devices and users may be referred to herein as user and device data.

FIG. 1 illustrates an embodiment of release information and user and device data being used to determine the software versions that may be allowed or not allowed to be installed on one or more devices. A software management entity 110 may be a software vendor or some other entity that makes software versions available, such as a device provider or a service provider. The software management entity 110 may manage a software loading service 112 that controls the installation of software versions. While the software loading service 112 is depicted within the software management entity 110, the software loading service 112 or a similar component may exist remotely from the software management entity 110. The software loading service 112 may include a software catalog 114 that lists all software versions available for installation by the software management entity 110. The software in the software catalog 114 may be organized according to device type or model such that, for a given device type or model, only the software relevant to that device type or model is listed in the software catalog 114. While the software catalog 114 is depicted within the software loading service 112, the software catalog 114 may exist remotely from the software loading service 112.

A server computer 122 or similar component may be present at a customer site 120, wherein the customer that manages the customer site 120 may be an organization that manages a large number of devices, as described above. Alternatively, the server 122 may be available to a customer via a network. Alternatively, the server 122 may be located at a site managed by the software management entity 110 and may be under the control of the software management entity 110. In some embodiments, the software management entity 110 and the customer that manages the customer site 120 may be the same entity, and in other embodiments, the software management entity 110 and the customer that manages the customer site 120 may be different entities.

In an embodiment, the software loading service 112 sends release information to the server 122, as shown at arrow 1. The release information may list all or a portion of the software versions currently available in the software catalog 114. More specifically, the release information may specify a set of software versions that are allowed or not allowed to be installed on one or more devices 140. The set of software versions may include a single software version, a single continuous range of software versions from a minimum version number to a maximum version number, multiple ranges of software versions with one or more exceptions between the ranges, multiple non-continuous software versions, or some other combination of software versions. When the release information specifies the software versions that are allowed to be installed on the device 140, software versions that are not listed in the release information may not be installed on the device 140. Alternatively or additionally, the release information may explicitly specify one or more software versions that are not allowed to be installed on the device 140.

The set of software versions listed in the release information may be determined based on one or more attributes of the devices 140 on which the software versions may be installed. For example, the set of software versions listed in the release information may be determined based on the hardware characteristics of the devices 140, such as model type, processing capability, memory capacity, or antenna configuration; on the software characteristics of the devices 140, such as the operating system version or other software already installed on the device 140; on the radio access technology or radio access network used by the device 140, such as 3G, 4G, LTE, WiFi, CDMA, GSM, GERAN, UTRAN, or E-UTRAN; and/or on other known attributes of the device 140. Such attributes may be taken into consideration in determining the software versions that are applicable to a given device 140, and only those versions that are applicable may be listed in the release information for that device 140.

In an embodiment, the software loading service 112 may send the release information to the server 122 in response to a request from the server 122 for information about available software versions. The server 122 may send such a request in response to a request from an administrator 130. Alternatively, the sending of the release information from the software loading service 112 to the server 122 may be triggered in some other manner.

At arrow 2, the server 122 stores the release information in a database 124 or a similar data storage component so that when the release information is needed, the release information can be quickly retrieved from the database 124 rather than being received from the software loading service 112.

An administrator 130 may oversee the installation of software on one or more devices 140. Although only one device is shown in FIG. 1, the administrator 130 may oversee a plurality of devices 140, and any discussion herein regarding a single device 140 may apply as well to multiple devices 140. In an embodiment, the administrator 130 is not under the management or control of the software management entity 110 or the customer that manages the customer site 120. Therefore, the administrator 130 has no control or input regarding which software versions are made available by the software loading service 112 in the form of the release information. Instead, the administrator 130 may view the software versions that are made available by the software loading service 112 and select which of the versions are allowed or not allowed to be installed on which of the devices 140. The administrator 130 may be separated from the server 122 by a firewall 150 or a similar security component.

The administrator 130 may have access to user and device data 160 that describes the characteristics of the devices 140 that the administrator 130 manages and the users of those devices 140. That is, the user and device data 160 may list any characteristics of the devices 140 or users that may affect which software is applicable to those devices 140 or users. The user and device data 160 may be organized according to device models and/or service providers such that any characteristics common to a particular device model and/or any characteristics common to a particular service provider are associated with the appropriate model or service provider. While the administrator 130 is depicted as having direct access to the user and device data 160, the user and device data 160 may be located at the software management entity 110, on the server 122, or in some other location.

In an embodiment, the administrator 130 may request release information from the server 122. That is, the administrator 130 may send a message to the server 122 asking the server 122 to provide information regarding the set of versions of software available for installation on one or more devices 140. As described above, the server 122 may have previously received such information from the software loading service 112 and may have stored that information in the database 124. At arrow 3, the server 122 retrieves the release information from the database 124, and at arrow 4, the server 122 sends the release information to the administrator 130.

In an embodiment, the administrator 130 may then use the release information and the user and device data 160 to create a profile for one or more devices 140 and/or device users. The profile may specify which software versions are allowed to be installed on which devices 140 and/or which software versions are prohibited from being installed on which devices 140. The specification may include a minimum release number and a maximum release number for the software versions that are allowed or not allowed on the device 140; a blacklist and/or whitelist of software versions that are prohibited or allowed on the device 140; any overrides or exceptions that may apply to the minimum release number, maximum release number, blacklist and/or whitelist; and/or any other combination of versions as described above with regard to the release information. A profile may be assigned to individual devices or users, to groups of devices or users, or globally to all devices or users in an organization. As discussed in more detail below, a plurality of profiles may be created for a device 140 or a group of devices 140, and the profiles may be ranked according to their precedence. One of the profiles may be designated as the default profile for one or more devices 140.

In an embodiment, the administrator 130 may determine the software versions to be included in the profile for one or more devices 140 based at least partially on the above-described attributes for the devices 140, such as hardware characteristics, software characteristics, radio access technology, and/or radio access network. Additionally or alternatively, the administrator 130 may specify in the profile one or more conditions under which one or more software versions included in the profile are to be applied to a device 140. For example, the administrator 130 may specify that a particular version is to be applied only at a particular time, such as a time of day or a day of the week. Additionally or alternatively, the administrator 130 may specify that a particular version is to be applied based on the location of the device 140. For instance, the administrator 130 may specify that a first version is to be applied if the device 140 is in use in a first country and a second version is to be applied if the device 140 is in use in a second country, or that a particular version is to be applied only if the device 140 is in use in a particular region, or that a particular version may not be applied if the device 140 is in use in a particular region, or that a particular version is to be applied based on some other location-based parameter related to the device 140. Additionally or alternatively, the administrator 130 may specify that a particular version is to be applied based on the roaming status of the device 140. Additionally or alternatively, the administrator 130 may specify that a particular version is to be applied based on the amount of memory currently available on the device 140. Additionally or alternatively, the administrator 130 may specify that the most recent software versions available to the device 140 are to be mandatorily installed on the device 140. As used herein, terms such as "applying a version" and the like may refer to installing a version or following a rule that prohibits the installation of a version.

As shown at arrow 5, after creating one or more profiles, the administrator 130 may then send the profile information to the server 122. The sending of the profile information to the server 122 may promote the eventual enforcement of the profile on the device 140 to which the profile pertains, where enforcement may include allowing installation of a software version listed in the profile, preventing installation of a software version listed in the profile, providing an alert that a software version listed in the profile is available for installation, and/or providing an alert that a software version listed in the profile is not available for installation. Such an alert may be sent to the device 140 or to some other component.

At arrow 6, the server 122 may store the profile information in the database 124 for future use. The server 122 may then use the information in the profile to create a payload that specifies the restrictions and/or allowances that pertain to the software for a specific device 140 or group of devices 140. The payload may be an Extensible Markup Language (XML) document or other file into which the server 122 has converted the profile information. At arrow 7, the server 122 sends the payload to the device 140. The server 122 may also store the payload in the database 124.

In some cases, multiple profiles may pertain to a single device. For example, all devices within a group of devices may be given a first profile that allows software up to and including a first version number to be installed on the devices. A number of users of the devices in that group may be beta testers who are testing a version of the software with a later version number than the first version number. The devices of those users may be given a second profile that allows the software with the later version number to be installed on those devices.

In an embodiment, when multiple profiles pertain to a single device, the server 122 may perform a reconciliation procedure to determine which of the profiles is to be enforced on the device at a given time. The reconciliation procedure may be based on a ranking of the profiles that specifies which profiles are to take precedence over others. The server 122 may then include the appropriate profile information in the payload.

In an embodiment, after receiving the payload, the device 140 may act as a pass-through and, at arrow 8, send the specific software version policy information that pertains to itself, as specified in the payload, to the software loading service 112. The software loading service 112 may then use the device-specific profile information to determine the software versions that may be installed on the device 140 or may be prohibited from being installed on the device 140. At arrow 9, the software loading service 112 sends the device 140 the versions that are to be installed on the device 140.

Figure 2:
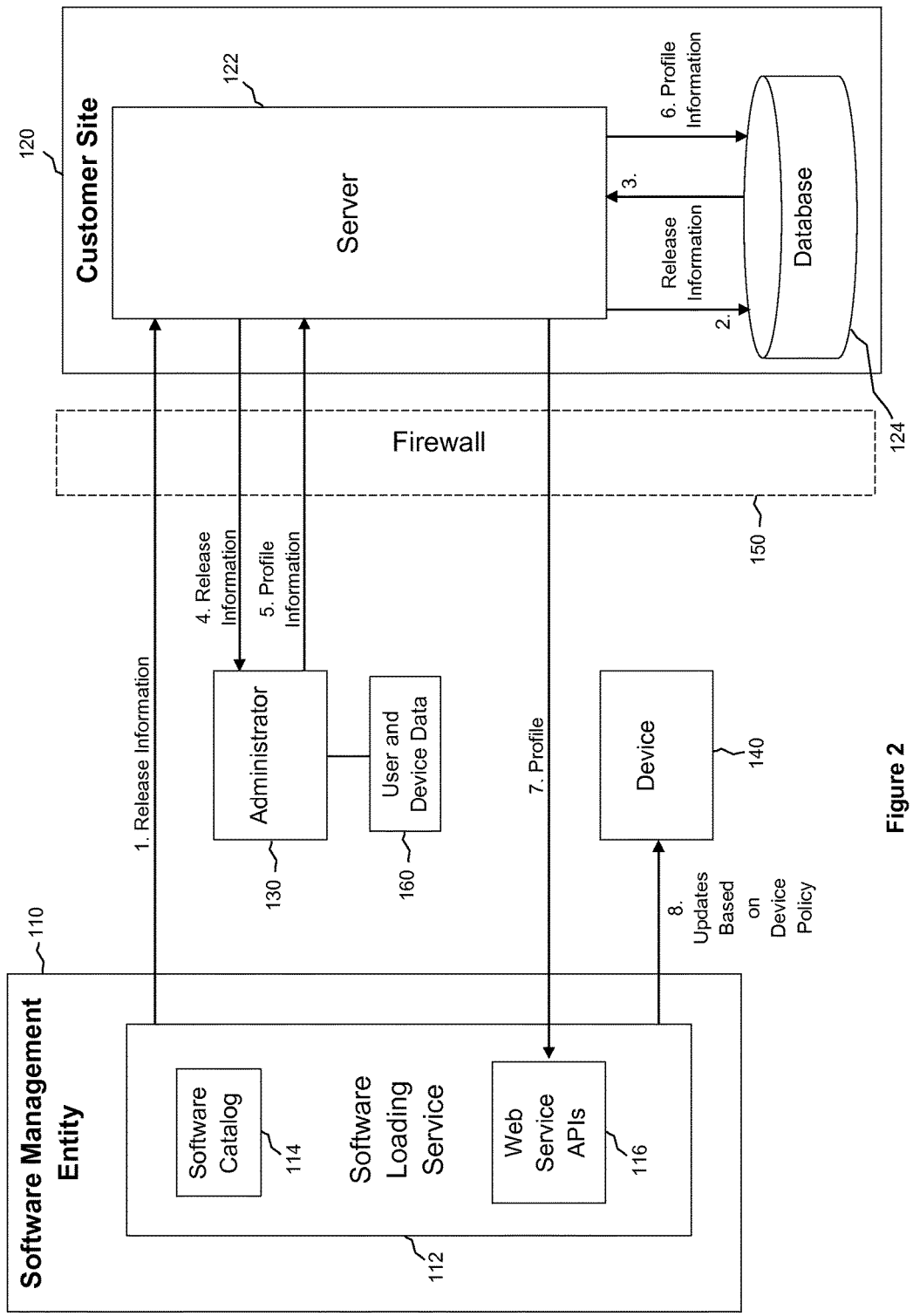
FIG. 2 is a block diagram of a system for managing software without passing software-related information through a device according to an embodiment of the disclosure.

In some cases, it may be preferable not to use the device 140 as a pass-through for the payload. Such an embodiment is illustrated in FIG. 2. In this case, it may not be possible to create a payload that is specific to a particular device 140. Instead, an entire profile containing software version policy information for a plurality of devices 140 may be sent directly from the server 122 to one or more web service application programming interfaces (APIs) 116 within or available to the software loading service 112, as shown at arrow 7. The software loading service 112 may then receive the profile from the APIs 116 and use the profile information to determine how the profile is enforced. That is, the software loading service 112 may determine which software versions are allowed to be installed on which devices 140 and/or which software versions are prohibited from being installed on which devices 140.

Figure 3:
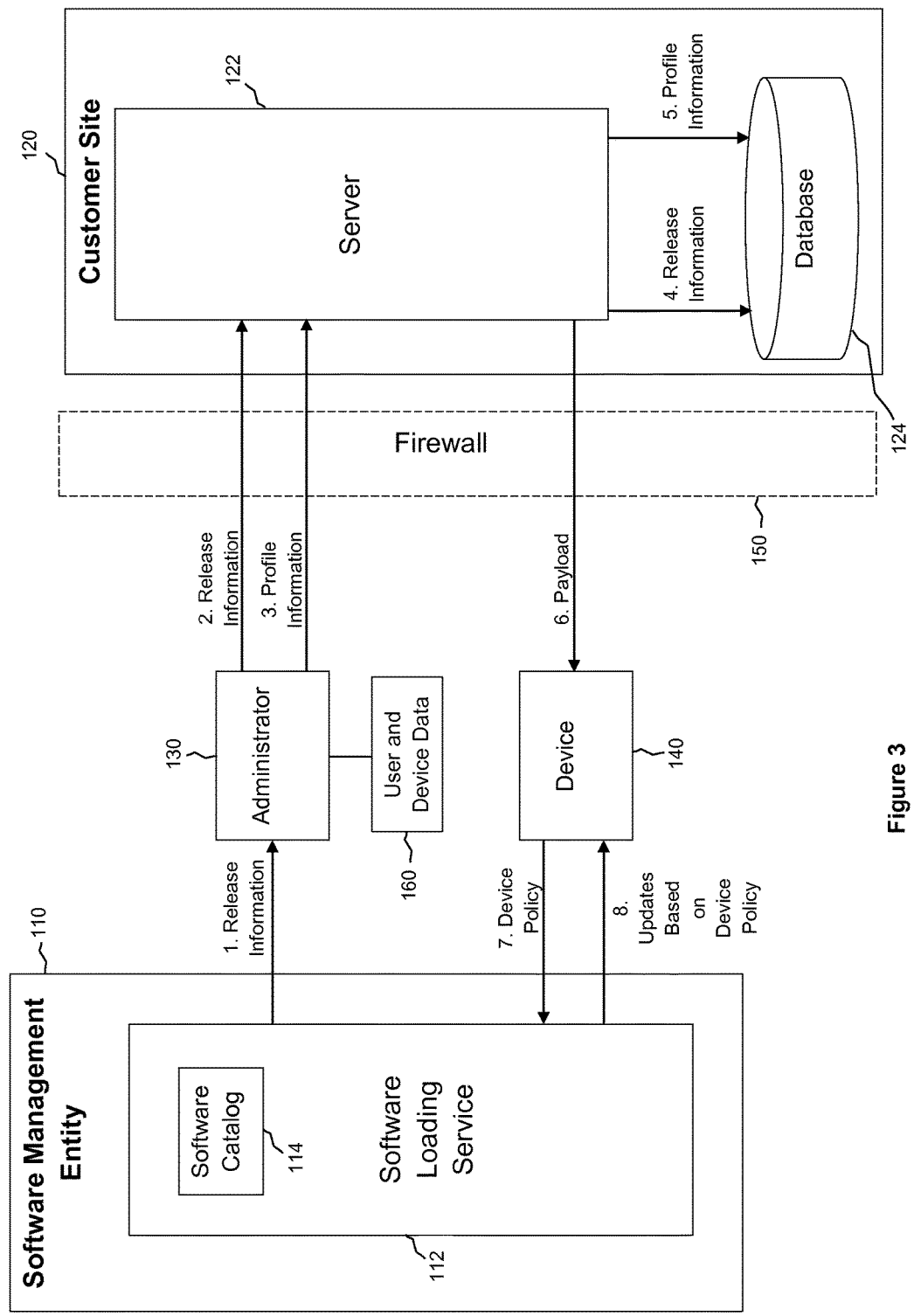
FIG. 3 is a block diagram of a system for managing software when an internet connection is not available according to an embodiment of the disclosure.

In some cases, the customer site 120 may not have an internet connection via which the server 122 can receive the release information from the software loading service 112. Such an embodiment is illustrated in FIG. 3. In such so-called "dark site" cases, the customer that manages the customer site 120 may be willing to accept incoming data transmitted from the administrator 130 but may not allow outgoing data to be transmitted to the administrator 130. The administrator 130 may receive the release information from the software loading service 112, as shown at arrow 1. The administrator 130 may then use the received release information and the available user and device data 160 to create one or more profiles as described above. The administrator 130 may then transmit the release information and the profile information to the server 122, as shown at arrows 2 and 3. As an example, the administrator may export a file from the software loading service 112 and import the file into the server 122. The server 122 may then create a payload and send the payload to the device 140 as described above. Since the server 122 has no internet connection in this case, the payload may be sent to the software loading service 112 via the device 140 rather than through a web service API. The server 122 may communicate with the device 140 via WiFi or a similar communication protocol.

The components described above for controlling the software versions that are applied to devices may also be used to determine whether a device is in compliance with the software version policies specified for the device. Returning to FIG. 1 as an example, the server 122 may know the profile assigned to the device 140 and the software installed on the device 140. Therefore, the server 122 can compare the software that the profile allows to be installed on the device 140 to the software that is actually installed on the device 140 and determine if the device 140 is in compliance with its profile. For example, the profile may specify that operating system software only within the range of version 10.2 to 10.4 is allowed to be installed on the device 140. If the server 122 determines that version 10.1 is installed on the device 140, the server may determine that the device 140 is out of compliance with its profile. In other embodiments, an entity other than the server 122 may make such a comparison and determination.

In an embodiment, if the device 140 is found to be out of compliance, one or more actions may occur. For example, the server 122 may notify the administrator 130 and/or the user of the device 140 of the lack of compliance. The administrator 130 and/or the user of the device 140 may then take appropriate actions to ensure compliance with the profile. Alternatively or additionally, if the device 140 is found to be out of compliance, one or more actions may be taken to impair the functioning of the device 140 in some way. For example, the device 140 may be prevented from connecting to a network, one or more applications on the device 140 may be prevented from executing, the device 140 may be switched off, or some other action may be taken to affect the functionality of the device 140.

FIG. 4 illustrates a graphical user interface 410 that may be used by an administrator in creating profiles and managing software versions. The interface 410 may include a field 412 in which the administrator may enter a profile name and a field 414 in which the administrator may enter a profile description. A check box 416 or a similar input mechanism may allow the administrator to specify that an upgrade to the most recent available version should be forced for a given device or carrier. That is, the administrator may check the check box 416 to specify that the most recent software versions available to a device are to be mandatorily installed on the device, as described above.

A first dropdown box 418 or a similar input mechanism may allow the administrator to specify the minimum version number for a unit of software to be applied to a device, and a second dropdown box 420 or a similar input mechanism may allow the administrator to specify the maximum version number for that unit of software. That is, the administrator may use the dropdown boxes 418 and 420 and/or other similar input mechanisms to specify a set of software versions allowed or not allowed to be installed on the device. As described above, the specification may be based on hardware characteristics of the device, software characteristics of the device, a radio access technology or radio access network used by the device, a time or location associated with the device, a roaming status of the device, an amount of memory currently available on the device, and/or other attributes associated with the device.

As an example, the administrator may use the dropdown boxes 418 and 420 to create a profile that may contain an open upper bound in a range, such as 10.2.1 or higher. This means that the device can see version 10.2.1 and any versions of the software that are later than 10.2.1, including any new releases that are made available at a future time. Conversely, if the range is 10.2.1 to 10.3.1, this may mean that a software update is initially available in this range but it may also mean that updates outside the range are not seen. So software that may otherwise be publicly available may not available to the device with this policy.

In an embodiment, the administrator may user the interface 410 to specify a model number or other identifier for one or more devices for which a profile is being created. The dropdown boxes 418 and 420 and/or other input or output mechanisms in the interface 410 may then display only the software versions that pertain to that device model.

A data entry field 422 may allow the administrator to specify any exceptions or overrides that are to be made to the information entered elsewhere in the interface 410. The values that appear in the dropdown boxes 418 and 420, the data entry field 422, and/or other input or output mechanisms in the interface 410 may be populated from data in the software catalog 114 of FIGS. 1, 2, and 3. One of skill in the art may recognize that other fields may be present in the interface 410 to assist an administrator in creating a profile for one or more devices. When the administrator has entered information into the interface 410, the information from the interface 410 may then be processed to generate the profile information that the administrator may then send to the server 122 of FIGS. 1, 2, and 3.

After creating a profile for one or more devices in such a manner, the administrator may then return to the interface 410, create another profile for the same device or group of devices or for another device or group of devices, and send that profile to the server 122. Alternatively, the administrator may create a plurality of profiles in the interface 410 and then send all of the profiles to the server 122 in a batch. The administrator may continue such a procedure until all profiles have been created for all devices for which the administrator wishes to create a profile.

Figure 5:
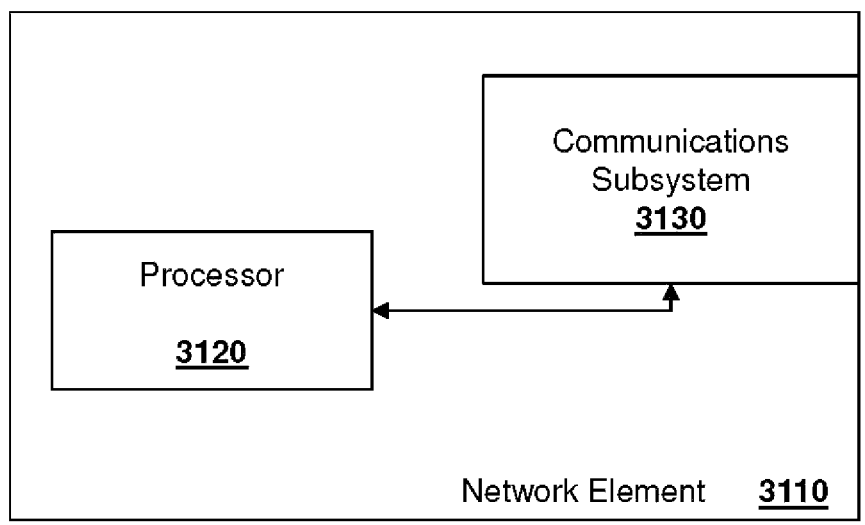
FIG. 5 is a simplified block diagram of an exemplary network element according to one embodiment.

The above may be implemented by a network element. A simplified network element is shown with regard to FIG. 5. In FIG. 5, network element 3110 includes a processor 3120 and a communications subsystem 3130, where the processor 3120 and communications subsystem 3130 cooperate to perform the methods described above.

Figure 6:
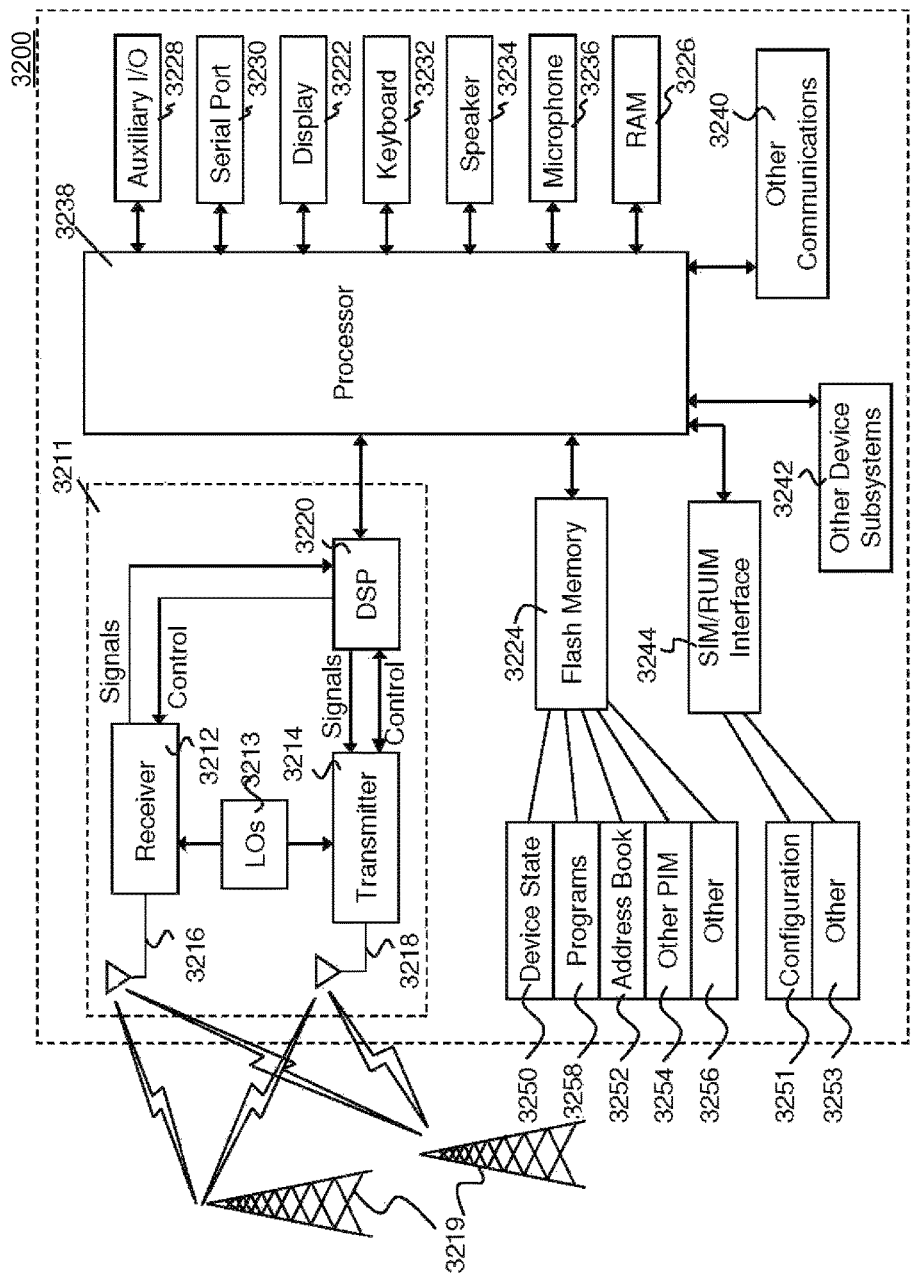
FIG. 6 is a block diagram with an example user equipment capable of being used with the systems and methods in the embodiments described herein.

Further, the above may be implemented by a UE. An example of a UE is described below with regard to FIG. 6. UE 3200 may comprise a two-way wireless communication device having voice and data communication capabilities. In some embodiments, voice communication capabilities are optional. The UE 3200 generally has the capability to communicate with other computer systems on the Internet. Depending on the exact functionality provided, the UE 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the UE 3200 is intended to operate.

Network access requirements may also vary depending upon the type of network 3219. In some networks, network access is associated with a subscriber or user of the UE 3200. The UE 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the UE 3200 may send and receive communication signals over the network 3219. As illustrated, the network 3219 may consist of multiple base stations communicating with the UE 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the UE 3200. A predetermined set of applications that control basic operations, including at least data and voice communication applications for example, may typically be installed on the UE 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the UE 3200 such as, but not limited to, e-mail, calendar events, voice mails, appointments, and task items. One or more memory stores may be available on the UE 3200 to facilitate storage of PIM data items. Such a PIM application may have the ability to send and receive data items via the wireless network 3219. Further applications may also be loaded onto the UE 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the UE 3200 and may provide enhanced on-device functions, communication-related functions, or both. For example, secure communication applications may enable electronic commerce functions and other such financial transactions to be performed using the UE 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the UE 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the UE 3200 is similar, except that received signals may typically be output to a speaker 3234 and signals for transmission may be generated by a microphone 3236. Alternative voice or audio I/O subsystems, such as a voice message recording subsystem, may also be implemented on the UE 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the UE 3200 by providing for information or software downloads to the UE 3200 other than through a wireless communication network. The alternate download path may, for example, be used to load an encryption key onto the UE 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMAX, near field communication (NFC), and/or radio frequency identification (RFID). The other communications element 3240 may also be used to communicate with auxiliary devices such as tablet displays, keyboards or projectors.

Figure 7:
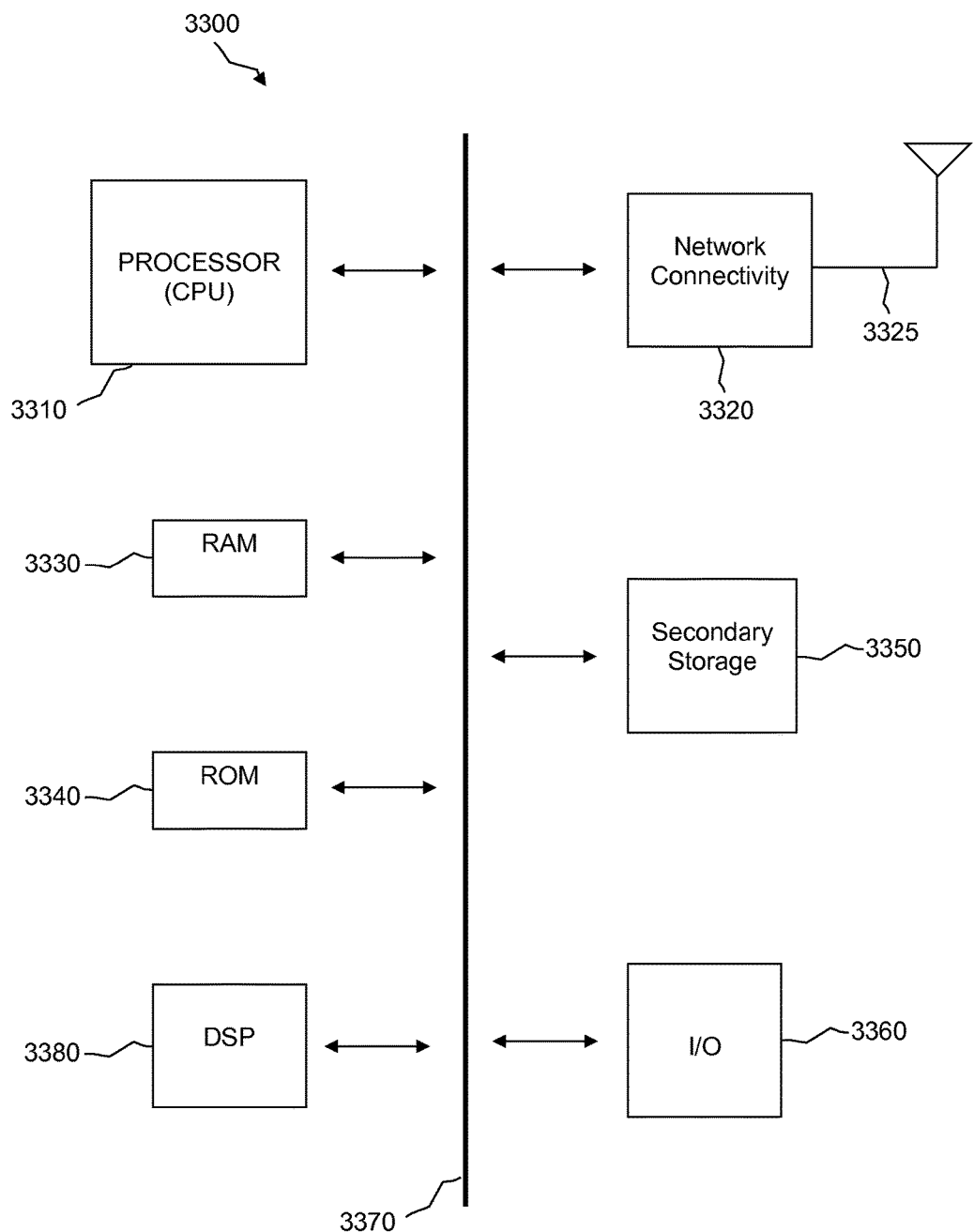
FIG. 7 illustrates a processor and related components suitable for implementing the several embodiments of the present disclosure.

The UE and other components described above might include a processing component that is capable of executing instructions related to the actions described above. FIG. 7 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method for managing software on a device is provided. The method comprises: receiving, from a third party associated with the device, by a software administrator of an organization different from the third party, release information regarding software versions for the device; creating, by the software administrator, a profile that specifies whether or not at least one of the software versions is allowed on the device; and transmitting the profile, by the software administrator to a server computer associated with the third or other parties, to promote enforcement of the profile for the device.

In another embodiment, another method for managing software on a device is provided. The method comprises: receiving, by a server computer under exclusive control of a third party, from a software loading service, release information regarding software versions for the device; transmitting, by the server computer to a software administrator of an organization different from the third party, the release information; receiving, by the server computer from the software administrator, at least one profile that specifies whether at least one of the software versions is allowed on the device or is prohibited on the device; and transmitting, by the server computer to the software loading service, information regarding a specified software version that is allowed on the device or is prohibited on the device, thereby causing the software loading service to make the specified software version available for installation on the device.

In another embodiment, a server computer is provided. The server computer comprises a memory and a processor. The processor is configured such that the server computer receives, from a software loading service, release information regarding software versions for a mobile device; further configured such that the server computer stores the release information to the memory; further configured such that the server computer transmits, to a software administrator of an organization different from the third party, the release information; further configured such that the server computer receives, from the software administrator, at least one profile that specifies whether at least one of the software versions is allowed on the device or is prohibited on the device; and further configured such that the server computer transmits to the software loading service information regarding a specified software version that is allowed on the device or is prohibited on the device, thereby causing the software loading service to make the specified software version available for installation on the device or causing the software loading service to prevent installation of the specified software version on the device.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing software on a device and implemented by an external administrator, the method comprising:
   receiving, from a server at a customer site and associated with the device, release information regarding software versions for the device and originating from a software loading service of a software management entity;
   creating, using the release information and using user and device data describing characteristics of the device and a user of the device, a profile that specifies whether or not at least one of the software versions is allowed on the device, wherein the user and device data are based on at least one of a model of the device or a service provider associated with the device, and wherein the profile further specifies that a particular one of the software versions is to be installed on the device based on an amount of memory currently available on the device; and
   transmitting profile information to the server to promote enforcement of the profile information for the device, wherein the profile information comprises the profile, wherein the external administrator is external to a network of the customer site and external to the software management entity.

2. The method of claim 1, wherein the enforcement comprises the server, in response to receiving the profile information, transmitting a payload towards the software loading service to cause the software loading service to enforce the profile on the device, wherein the payload is based on the profile information.

3. The method of claim 1, wherein the enforcement comprises at least one of:
   allowing installation of at least one software version on the device;
   preventing installation of at least one software version on the device;
   providing an alert on the device that at least one software version is available for installation on the device; and
   providing an alert on the device that at least one software version is not available for installation on the device.

4. The method of claim 1, further comprising transmitting to the server a request for the release information, wherein the receiving the release information is in response to the request.

5. The method of claim 1, further comprising further creating the profile via an interface that allows selection of at least one software version and selection of at least one action to be performed on the software version, wherein the action is one of installing the software version on the device or following a rule that prohibits installing the software version on the device, and wherein the interface further allows specification of a condition under which the action is to be taken, the condition being related to at least one of:
   a location of the device;
   a location in which the action is to be taken;
   a time when the action is to be taken;
   a roaming status of the device;
   the software version, wherein a most recent available software version is to be mandatorily installed on the device;
   a hardware characteristic of the device;
   a software characteristic of the device;

a radio access technology in use by the device; and
a radio access network in use by the device.

6. A server at a customer site, the server comprising:
a memory; and
a processor coupled to the memory and configured to:
receive, from a software loading service of a software management entity, release information regarding software versions for a device;
cause the memory to store the release information;
transmit the release information to an external administrator;
receive, from the external administrator, profile information to promote enforcement of the profile information for the device, wherein the profile information comprises a profile created using the release information and using user and device data describing characteristics of the device and a user of the device, wherein the user and device data are based on at least one of a model of the device or a service provider associated with the device, wherein the profile specifies whether at least one of the software versions is allowed on the device or is prohibited on the device;
transmit a payload towards the software loading service to cause the software loading service to make a specified software version available for installation on the device or to cause the software loading service to prevent installation of the specified software version on the device, wherein the payload is based on the profile information; and
when the server receives more than one profile for the device, perform a reconciliation procedure to determine which of the profiles is to be enforced on the device, wherein the server performs the reconciliation procedure based on a ranking that specifies which of the profiles are to take precedence over others,
wherein the external administrator is external to a network of the customer site and external to the software management entity.

7. The method of claim 1, wherein the profile further specifies that a particular one of the software versions is to be installed on the device only at a particular time.

8. A method for managing software on a device and implemented by a server at a customer site, the method comprising:
receiving, from a software loading service of a software management entity, release information regarding software versions for the device;
transmitting the release information to an external administrator;
receiving, from the external administrator, profile information to promote enforcement of the profile information for the device, wherein the profile information comprises a profile created using the release information and using user and device data describing characteristics of the device and a user of the device, wherein the user and device data are based on at least one of a model of the device or a service provider associated with the device, wherein the profile specifies whether at least one of the software versions is allowed on the device or is prohibited on the device;
transmitting a payload towards the software loading service to cause the software loading service to make a specified software version available for installation on the device or to cause the software loading service to prevent installation of the specified software version on the device, wherein the payload is based on the profile information; and
when the server receives more than one profile for the device, performing a reconciliation procedure to determine which of the profiles is to be enforced on the device, wherein the server performs the reconciliation procedure based on a ranking that specifies which of the profiles are to take precedence over others,
wherein the external administrator is external to a network of the customer site and external to the software management entity.

9. The method of claim 8, further comprising further transmitting the release information in response to receiving a request for the release information from the external administrator.

10. The method of claim 8, further comprising storing the release information in a data storage component accessible to the server, wherein the software loading service is external to the device.

11. The method of claim 8, further comprising further transmitting the payload to the device to cause the device to forward to the software loading service a device policy based on the payload.

12. The method of claim 8, wherein, when a first software installed on the device does not correspond to a second software specified in the profile, the method further comprises:
sending the external administrator a first message informing the external administrator that the first software does not correspond to the second software;
sending the device a second message informing the device that the first software does not correspond to the second software; and
taking an action to impair functioning of the device.

13. The method of claim 8, wherein the software versions are based on at least one of:
a hardware characteristic of the device;
a software characteristic of the device;
a radio access technology in use by the device; and
a radio access network in use by the device.

14. The server of claim 6, wherein the software versions are based on at least one of:
a hardware characteristic of the device;
a software characteristic of the device;
a radio access technology in use by the device; and
a radio access network in use by the device.

15. The server of claim 6, wherein the processor is further configured to further transmit the release information in response to receiving a request for the release information from the external administrator.

16. The server of claim 14, wherein the software loading service is external to the device.

17. The server of claim 6, wherein the processor is further configured to further transmit the payload to the device to cause the device to forward to the software loading service a device policy based on the payload.

18. The server of claim 6, wherein, when a first software installed on the device does not correspond to a second software specified in the profile, the processor is further configured to perform:
sending the external administrator a first message informing the external administrator that the first software does not correspond to the second software;
sending the device a second message informing the device that the first software does not correspond to the second software; and
taking an action to impair functioning of the device.

19. The method of claim 1, wherein the profile further specifies that a particular one of the software versions is to be installed on the device based on a roaming status of the device.

* * * * *